US008499086B2

(12) United States Patent
Koning et al.

(10) Patent No.: US 8,499,086 B2
(45) Date of Patent: Jul. 30, 2013

(54) CLIENT LOAD DISTRIBUTION

(75) Inventors: G. Paul Koning, New Boston, NH (US);
Peter C. Hayden, Mount Vernon, NH (US); Paula Long, Hollis, NH (US);
Daniel E. Suman, Westford, MA (US)

(73) Assignee: Dell Products L.P., Round Rock, TX (US)

(*) Notice: Subject to any disclaimer, the term of this patent is extended or adjusted under 35 U.S.C. 154(b) by 2036 days.

(21) Appl. No.: 10/762,985

(22) Filed: Jan. 21, 2004

(65) Prior Publication Data

US 2004/0215792 A1    Oct. 28, 2004

Related U.S. Application Data

(60) Provisional application No. 60/441,810, filed on Jan. 21, 2003.

(51) Int. Cl.
*G06F 15/16* (2006.01)
*G06F 15/173* (2006.01)

(52) U.S. Cl.
USPC ................... 709/229; 709/219; 709/223

(58) Field of Classification Search
USPC ............. 709/217, 223, 224, 225, 238–242, 709/219, 229
See application file for complete search history.

(56) References Cited

U.S. PATENT DOCUMENTS

| | | | |
|---|---|---|---|
| 5,392,244 A | | 2/1995 | Jacobson et al. |
| 5,774,660 A | * | 6/1998 | Brendel et al. ............... 709/201 |
| 5,774,668 A | * | 6/1998 | Choquier et al. ............. 709/223 |
| 5,978,844 A | * | 11/1999 | Tsuchiya et al. ............. 709/221 |
| 6,070,191 A | | 5/2000 | Narendran et al. |
| 6,108,727 A | | 8/2000 | Boals et al. |
| 6,122,681 A | | 9/2000 | Aditya et al. |
| 6,128,279 A | * | 10/2000 | O'Neil et al. ................. 370/229 |
| 6,141,688 A | | 10/2000 | Bi et al. |
| 6,144,848 A | | 11/2000 | Walsh et al. |
| 6,148,414 A | | 11/2000 | Brown et al. |
| 6,189,079 B1 | | 2/2001 | Micka et al. |
| 6,195,682 B1 | | 2/2001 | Ho et al. |
| 6,199,112 B1 | | 3/2001 | Wilson |

(Continued)

FOREIGN PATENT DOCUMENTS

| | | |
|---|---|---|
| JP | 2002-278823 A | 9/2002 |
| WO | WO 99/53415 A | 10/1999 |

(Continued)

OTHER PUBLICATIONS

Baltazar, H. and Garcia, A. Build Your Own SAN (2002).
Druschel, P., Rice University and Rowstron, A., Microsoft Research, Cambridge, UK. PAST: A Large-Scale, Persistent Peer-to-peer Storage Utility.
Ottem, E, "Getting the Most From your Storage: How to Deploy a SAN," Gadzoox Networks, Inc. (1999).
Networking with Pyramix.

(Continued)

*Primary Examiner* — Ario Etienne
*Assistant Examiner* — Sargon Nano
(74) *Attorney, Agent, or Firm* — Hamilton, Brook, Smith & Reynolds, P.C.

(57) ABSTRACT

Systems and methods for providing an efficient partitioned resource server. In one embodiment, the partitioned resource server comprises a plurality of individual servers, and the individual servers appear to be equivalent to a client. Each of the individual servers may include a routing table that includes a reference for each resource that is maintained on the partitioned resource server. Requests from a client are processed as a function of the routing table to route the request to the individual server that maintains or has control over the resource of interest.

25 Claims, 6 Drawing Sheets

U.S. PATENT DOCUMENTS

| | | | |
|---|---|---|---|
| 6,212,565 B1 | 4/2001 | Gupta | |
| 6,212,606 B1 | 4/2001 | Dimitroff | |
| 6,226,684 B1 | 5/2001 | Sung et al. | |
| 6,292,181 B1 | 9/2001 | Banerjee et al. | |
| 6,341,311 B1 | 1/2002 | Smith et al. | |
| 6,360,262 B1 | 3/2002 | Guenthner et al. | |
| 6,421,723 B1 | 7/2002 | Tawil | |
| 6,434,683 B1 | 8/2002 | West et al. | |
| 6,449,688 B1* | 9/2002 | Peters et al. | 711/112 |
| 6,460,082 B1* | 10/2002 | Lumelsky et al. | 709/226 |
| 6,460,083 B1 | 10/2002 | Niwa et al. | |
| 6,463,454 B1* | 10/2002 | Lumelsky et al. | 718/105 |
| 6,466,980 B1* | 10/2002 | Lumelsky et al. | 709/226 |
| 6,473,791 B1 | 10/2002 | Al-Ghosein et al. | |
| 6,498,791 B2 | 12/2002 | Pickett et al. | |
| 6,516,350 B1* | 2/2003 | Lumelsky et al. | 709/226 |
| 6,598,134 B2 | 7/2003 | Ofek et al. | |
| 6,687,731 B1 | 2/2004 | Kavak | |
| 6,725,253 B1* | 4/2004 | Okano et al. | 709/203 |
| 6,732,171 B2 | 5/2004 | Hayden | |
| 6,742,059 B1 | 5/2004 | Todd et al. | |
| 6,766,348 B1 | 7/2004 | Combs et al. | |
| 6,813,635 B1 | 11/2004 | Jorgenson | |
| 6,850,982 B1 | 2/2005 | Siegel | |
| 6,859,834 B1* | 2/2005 | Arora et al. | 709/227 |
| 6,886,035 B2 | 4/2005 | Wolff | |
| 6,889,249 B2* | 5/2005 | Miloushev et al. | 709/213 |
| 6,910,150 B2 | 6/2005 | Mashayekhi et al. | |
| 6,944,777 B1 | 9/2005 | Belani et al. | |
| 6,950,848 B1* | 9/2005 | Yousefi'zadeh | 709/203 |
| 6,957,433 B2 | 10/2005 | Umberger et al. | |
| 6,985,956 B2* | 1/2006 | Luke et al. | 709/229 |
| 6,996,645 B1* | 2/2006 | Wiedenman et al. | 710/107 |
| 7,003,628 B1* | 2/2006 | Wiedenman et al. | 711/118 |
| 7,043,564 B1* | 5/2006 | Cook et al. | 709/246 |
| 7,047,287 B2* | 5/2006 | Sim et al. | 709/221 |
| 7,051,131 B1* | 5/2006 | Wiedenman et al. | 710/107 |
| 7,061,923 B2* | 6/2006 | Dugan et al. | 370/396 |
| 7,076,655 B2 | 7/2006 | Griffin et al. | |
| 7,085,829 B2* | 8/2006 | Wu et al. | 709/223 |
| 7,089,293 B2* | 8/2006 | Grosner et al. | 709/217 |
| 7,165,095 B2* | 1/2007 | Sim | 709/217 |
| 7,181,523 B2* | 2/2007 | Sim | 709/226 |
| 7,290,000 B2* | 10/2007 | Meifu et al. | 709/203 |
| 7,356,498 B2* | 4/2008 | Kaminsky et al. | 705/37 |
| 7,356,619 B2* | 4/2008 | Anderson et al. | 710/8 |
| 7,421,545 B1* | 9/2008 | Wiedenman et al. | 711/154 |
| 7,574,527 B1* | 8/2009 | Tormasov et al. | 709/243 |
| 7,685,126 B2* | 3/2010 | Patel et al. | 707/770 |
| 7,739,451 B1* | 6/2010 | Wiedenman et al. | 711/118 |
| 8,055,706 B2* | 11/2011 | Koning et al. | 709/203 |
| 8,209,515 B2 | 6/2012 | Schott | |
| 2001/0039581 A1 | 11/2001 | Deng et al. | |
| 2002/0008693 A1 | 1/2002 | Banerjee et al. | |
| 2002/0009079 A1 | 1/2002 | Jungck et al. | |
| 2002/0035667 A1 | 3/2002 | Bruning et al. | |
| 2002/0059451 A1 | 5/2002 | Haviv et al. | |
| 2002/0065799 A1 | 5/2002 | West et al. | |
| 2002/0069241 A1* | 6/2002 | Narlikar et al. | 709/203 |
| 2002/0103889 A1* | 8/2002 | Markson et al. | 709/223 |
| 2002/0138551 A1 | 9/2002 | Erickson | |
| 2002/0194324 A1 | 12/2002 | Guha | |
| 2003/0005119 A1 | 1/2003 | Mercier et al. | |
| 2003/0074596 A1 | 4/2003 | Mashayckhi et al. | |
| 2003/0117954 A1 | 6/2003 | De Neve et al. | |
| 2003/0120723 A1* | 6/2003 | Bright et al. | 709/203 |
| 2003/0154236 A1* | 8/2003 | Dar et al. | 709/201 |
| 2003/0212823 A1* | 11/2003 | Anderson et al. | 709/245 |
| 2003/0225884 A1 | 12/2003 | Hayden | |
| 2004/0049564 A1 | 3/2004 | Ng et al. | |
| 2004/0080558 A1 | 4/2004 | Blumenau et al. | |
| 2004/0083345 A1 | 4/2004 | Kim et al. | |
| 2004/0090966 A1* | 5/2004 | Thomas | 370/395.52 |
| 2004/0103104 A1 | 5/2004 | Hara et al. | |
| 2004/0128442 A1 | 7/2004 | Hinshaw et al. | |
| 2004/0143637 A1 | 7/2004 | Koning et al. | |
| 2004/0153479 A1* | 8/2004 | Mikesell et al. | 707/200 |
| 2004/0210724 A1 | 10/2004 | Koning et al. | |
| 2005/0010618 A1 | 1/2005 | Hayden | |
| 2005/0144199 A2 | 6/2005 | Hayden | |
| 2008/0021907 A1* | 1/2008 | Patel et al. | 707/10 |
| 2008/0243773 A1* | 10/2008 | Patel et al. | 707/2 |
| 2009/0271589 A1* | 10/2009 | Karpoff et al. | 711/170 |
| 2010/0235413 A1* | 9/2010 | Patel et al. | 707/825 |
| 2010/0257219 A1* | 10/2010 | Patel et al. | 707/827 |

FOREIGN PATENT DOCUMENTS

| | | |
|---|---|---|
| WO | WO-01/38983 | 5/2001 |
| WO | WO-02/37943 | 5/2002 |
| WO | WO-02/44885 | 6/2002 |
| WO | WO-02/056182 | 7/2002 |

OTHER PUBLICATIONS

Storage Area Networking (SAN)—The Veritas Strategy. Q Associates (2000).

Rapaport, L. and Baltazar, H., Introduction to SANs: Technology, Benefits, and Applications, (Jul. 9, 2001).

"Enlist Desktops to Mirror Data," TechTarget (2002).

Scheuermann P. et al: "Data Partitioning and Load Balancing in Parallel Disk Systems" Techn. Rpt. A/02/96 University of Saarland. pp. 1-48.

Wei Lui et al: "Design of an I/O balancing file system on web server clusters" Parallel Processing 2000 Intern. Workshops on Aug. 21-24, 2000, Piscataway, NJ, USA, IEEE, Aug. 21, 2000, pp. 119-125.

Anderson T E et al: "Serverless Network File Systems" ACM Transactions on Computer Systems, Assoc. for Computing Machinery, New York, US, vol. 14, No. 1, pp. 41-79, Feb. 1, 1996.

Hac A et al: IEEE: "Dynamic load balancing in a distributed system using a decentralized algorithm" Int. Conf. on Distributed Computing Systems, West Berlin, Sep. 21, 1987. Conf. Proceedings vol. 7, pp. 170-177. Sep. 21, 1987.

Hartman J H et al: "The Zebra Striped Network File System" Operating Review (SIGOPS), ACM Headquarter New York, US vol. 27, No. 5, Dec. 1, 1993, pp. 29-43.

U.S. Appl. No. 60/411,743, Hinshaw et al.

U.S. Patent and Trademark Office, Office Action mailed Feb. 12, 2010, U.S. Appl. No. 11/585,363.

U.S. Patent and Trademark Office, Office Action mailed Oct. 21, 2010, U.S. Appl. No. 11/585,363.

Nakao, Kenichi, "Oracle 7 Server R.7.3.22", Oracle Life, BNN Inc. Dec. 13, 1996, 1-7, pp. 36-39 (Domestic Engineering magazine 1997-00832-033).

Saito, Kunihiro, "Kensho Windows 2000", Nikkei Internet Technology, Nikkei Business Publications Inc., Nov. 11, 1999, vol. 29, pp. 116-127 (Domestic Engineering magazine 2000-00845-001).

Arima, Tadao, "Windows 2000 de NT domain ha ko kawaru: Windows 2000 domain sekkei no chuiten", Nikkei Windows NT, Nikkei Business Publications Inc., Aug. 1, 1000, vol. 29, pp. 155-162 (Domestic Engineer magazine 2000-01217-017).

Nakayama, Satoru, "Hayaku, rakuni, kakujituni, download wo tukao. Reget wo tsukao", ASCII NET J, ASCII Corporation, Aug. 4, 2000, vol. 5, pp. 32-33 (Domestic engineering magazine 2001-00219-013).

Office Action for U.S. Appl. No. 10/762,984; Mail Date: Mar. 10, 2006.

Office Action for U.S. Appl. No. 10/762,984; Mail Date: Aug. 18, 2006.

Office Action for U.S. Appl. No. 10/762,984; Mail Date: Mar. 21, 2007.

Office Action for U.S. Appl. No. 10/762,984; Mail Date: Jan. 4, 2008.

Final Office Action for U.S. Appl. No. 10/762,984; Mail Date: Sep. 10, 2008.

Notice of Appeal for U.S. Appl. No. 10/762,984.

Appeal Brief for U.S. Appl. No. 10/762,984.

Amended Appeal Brief for U.S. Appl. No. 10/762,984.

2nd Amended Appeal Brief for U.S. Appl. No. 10/762,984.

Examiner's Answer for U.S. Appl. No. 10/762,984; Mail Date: Jan. 28, 2010.

Examiner's Answer for U.S. Appl. No. 10/762,984; Mail Date: Feb. 22, 2010.

* cited by examiner

Volume 18

| Page | Server ID |
|---|---|
| 0 | 1 |
| 1 | 3 |
| 2 | 2 |
| 3 | 1 |
| ... | ... |
| 7942 | 1 |
| ... | ... |

| Server ID | Server |
|---|---|
| 1 | 161 |
| 2 | 162 |
| 3 | 163 |

Volume 17

| Page | Server ID |
|---|---|
| 0 | 1 |
| 1 | 2 |
| 2 | 2 |
| 3 | 1 |
| ... | ... |
| 9197 | 2 |
| ... | ... |

| Server ID | Server |
|---|---|
| 1 | 162 |
| 2 | 163 |

Fig. 6

CLIENT LOAD DISTRIBUTION

REFERENCE TO RELATED APPLICATION

This application claims priority to U.S. Provisional Application Ser. No. 60/441,810 filed Jan. 21, 2003 and naming G. Paul Koning, among others, as an inventor, the contents of which are incorporated by reference.

BACKGROUND OF THE INVENTION

The invention relates to data storage and in particular to data block storage services that store data blocks across a plurality of servers.

The client/server architecture has been one of the more successful innovations in information technology. The client/server architecture allows a plurality of clients to access services and resources maintained and/or controlled by a server. The server listens for, and responds to, requests from the clients and in response to the request determines whether or not the request can be satisfied. The server responds to the client as appropriate. A typical example of a client/server system is where a server is set up to store data files and a number of different clients can communicate with the server for the purpose of requesting the server to grant access to different ones of the data files maintained by the file server. If a data file is available and a client is authorized to access that data file, the server can deliver the requested data file to the server and thereby satisfy the client's request.

Although the clientserver architecture has worked remarkably well it does have some drawbacks. In particular, the clientserver environment is somewhat dynamic. For example, the number of clients contacting a server and the number of requests being made by individual clients can vary significantly over time. As such, a server responding to client requests may find itself inundated with a volume of requests that is impossible or nearly impossible to satisfy. To address this problem, network administrators often make sure that the server includes sufficient data processing resources to respond to anticipated peak levels of client requests. Thus, for example, the network administrator may make sure that the server comprises a sufficient number of central processing units (CPUs) with sufficient memory and storage space to handle the volume of client traffic that may arrive.

Even with a studied provisioning of resources, variations in client load can still burden a server system. For example, even if sufficient hardware resources are provided in the server system, it may be the case that client requests focus on a particular resource maintained by the server and supported by only a portion of the available resources. Thus, continuing with our above example, it is not uncommon that client requests overwhelmingly focus on a small portion of the data files maintained by the file server. Accordingly, even though the file server may have sufficient hardware resources to respond to a certain volume of client requests, if these requests are focused on a particular resource, such as a particular data file, most of the file server resources will remain idle while those resources that support the data file being targeted by the plurality of clients are over burdened.

To address this problem, network engineers have developed load balancing systems that act as a gateway to client requests and distribute client requests across the available resources for the purpose of distributing client load. To this end, the gateway system may distribute client requests in a round-robin fashion that evenly distributes requests across the available server resources. In other practices, the network administrator sets up a replication system that can identify when a particular resource is the subject of a flurry of client requests and duplicates the targeted resource so that more of the server resources are employed in supporting client requests for that resource.

Although the above techniques may work well with certain server architectures, they each require that a central transaction point be disposed between the clients and the server. As such, this central transaction point may act as a bottle neck that slows the servers response to client requests. Accordingly, there is a need in the art for a method for distributing client load across a server system while at the same time providing suitable response times for these incoming client requests.

SUMMARY OF THE INVENTION

The systems and methods described herein, include systems for managing requests for a plurality of clients for access to a set of resources. In one embodiment, the systems comprise a plurality of servers wherein the set of resources is partitioned across this plurality of servers. Each server has a load monitor process that is capable of communicating with the other load monitor processes for generating a measure of the client load on the server system and the client load on each of the respective servers.

Accordingly, in one embodiment, the systems comprise a server system having a plurality of servers, each of which has a load monitor process that is capable of coordinating with other load monitor processes executing on other servers to generate a system-wide view of the client load being handled by the server system and by individual respective servers.

Optionally, the systems may further comprise a client distribution process that is responsive to the measured system load and is capable of repartitioning the set of client connections among the server systems to thereby redistribute the client load.

Accordingly, it will be understood that the systems and methods described herein include client distribution systems that may work with a partitioned service, wherein the partitioned service is supported by a plurality of equivalent servers each of which is responsible for a portion of the service that has been partitioned across the equivalent servers. In one embodiment each equivalent server is capable of monitoring the relative load that each of the clients that server is communicating with is placing on the system and on that particular server. Accordingly, each equivalent server is capable of determining when a particular client would present a relative burden to service. However, for a partitioned service each client is to communicate with that equivalent server that is responsible for the resource of interest of the client. Accordingly, in one embodiment, the systems and methods described herein redistributed client load by, in part, redistributing resources across the plurality of servers.

In another embodiment, the systems and methods described herein include storage area network systems that may be employed for providing storage resources for an enterprise. The storage area network (SAN) of the invention comprises a plurality of servers and/or network devices that operate on the storage area network. At least a portion of the servers and network devices operating on the storage area network include a load monitor process that monitors the client load being placed on the respective server or network device. The load monitor process is further capable of communicating with other load monitor processes operating on the storage area network. The load monitor process on the server is capable of generating a system-wide load analysis that indicate the client load being placed on the storage area network. Additionally, the load monitor process is capable of generating an analysis of the client load being placed on that respective server and/or network device. Based on the client load information observed by the load monitor process, the storage area network is capable of redistributing client load to achieve greater responsiveness to client requests. In one embodiment, the storage area network is capable of moving the client connections supported by the system for the purpose of redistributing client load across the storage area network.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

FIG. 6 depicts one example of a routing table suitable for use with the systems and methods described herein.

DETAILED DESCRIPTION OF CERTAIN ILLUSTRATED EMBODIMENTS

The systems and methods described herein include systems for organizing and managing resources that have been distributed over a plurality of servers on a data network. More particularly, the systems and methods described herein include systems and methods for providing more efficient operation of a partitioned service. The type of service can vary, however for purpose of illustration the invention will be described with reference to systems and methods for managing the allocation of data blocks across a partitioned volume of storage. It will be understood by those of skill in the art that the other applications and services may include, although are not limited to, distributed file systems, systems for supporting application service providers and other applications. Moreover, it will be understood by those of ordinary skill in the art that the systems and methods described herein are merely exemplary of the kinds of systems and methods that may be achieved through the invention and that these exemplary embodiments may be modified, supplemented and amended as appropriate for the application at hand.

Figure 1:
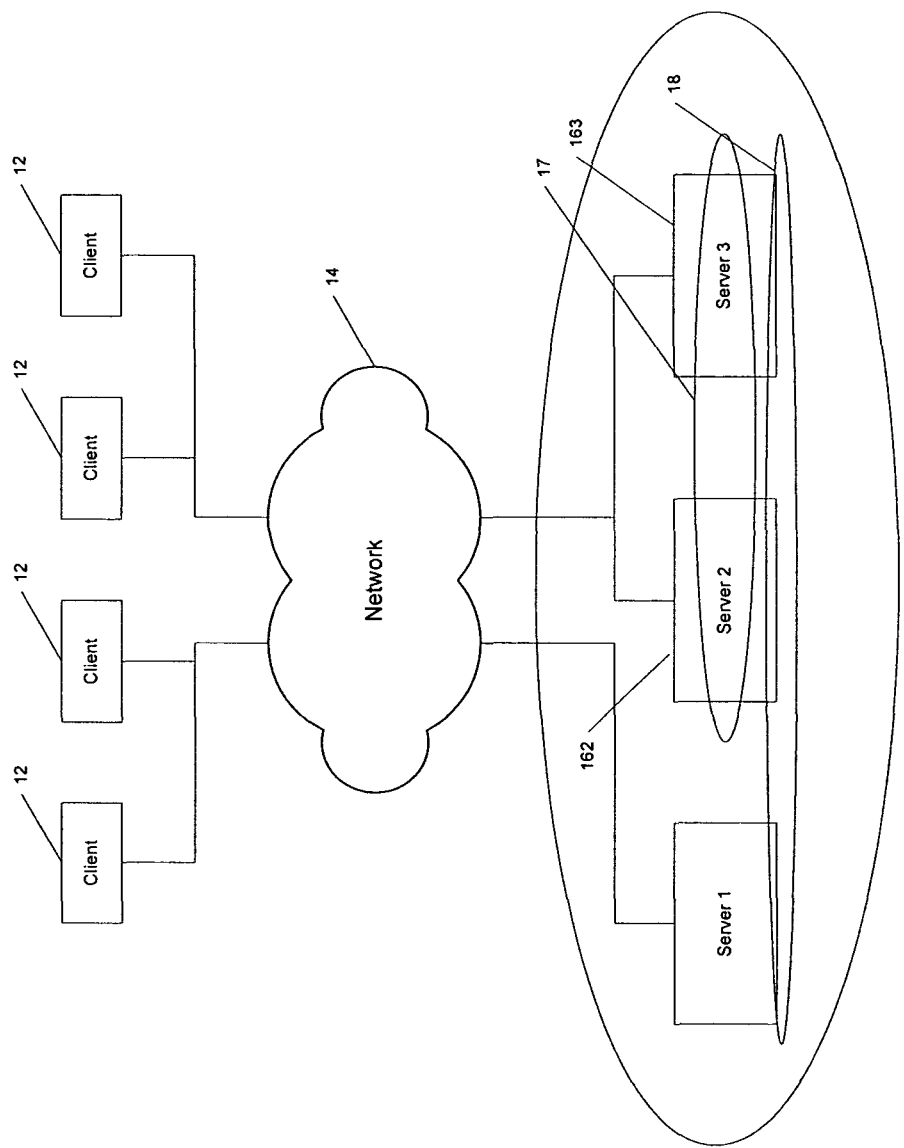
FIG. 1 is a schematic diagram of a client-server architecture with servers organized in server groups.

Referring first to FIG. 1 one embodiment of a system according to the invention is depicted. As show in FIG. 1, one or several clients 12 are connected, for example via a network 14, such as the Internet, an intranet, a WAN or LAN, or by direct connection, to servers 161, 162, and 163 that are part of a server group 16.

The client 12 can be any suitable computer system such as a PC workstation, a handheld computing device, a wireless communication device, or any other such device, equipped with a network client program capable of accessing and interacting with the server 16 to exchange information with the server 16. Optionally, the client 12 and the server 16 rely on an unsecured communication path for accessing services at the remote server 16. To add security to such a communication path, the client 12 and the server 16 may employ a security system, such as any of the conventional security systems that have been developed to provide to the remote user a secured channel for transmitting data over a network. One such system is the Netscape secured socket layer (SSL) security mechanism that provides to a remote user a trusted path between a conventional web browser program and a web server.

FIG. 1 further depicts that the client 12 may communicate with a plurality of servers, 161, 162 and 163. The servers 161, 162 and 163 employed by the system 10 may be conventional, commercially available server hardware platforms, such as a Sun Sparc™ systems running a version of the Unix operating system. However any suitable data processing platform may be employed. Moreover, it will be understood that one or more of the servers 161, 162 or 163 may comprise a network device, such as a tape library, or other device, that is networked with the other servers and clients through network 14.

Each server 161, 162 and 163 may include software components for carrying out the operation and the transactions described herein, and the software architecture of the servers 161, 162 and 163 may vary according to the application. In certain embodiments, the servers 161, 162 and 163 may employ a software architecture that builds certain of the processes described below into the server's operating system, into device drivers, into application level programs, or into a software process that operates on a peripheral device, such as a tape library, a RAID storage system or some other device. In any case, it will be understood by those of ordinary skill in the art, that the systems and methods described herein may be realized through many different embodiments, and practices, and that the particular embodiment and practice employed will vary as a function of the application of interest and all these embodiments and practices fall within the scope hereof.

In operation, the clients 12 will have need of the resources partitioned across the server group 16. Accordingly, each of the clients 12 will send requests to the server group 16. The clients typically act independently, and as such, the client load placed on the server group 16 will vary over time. In a typical operation, a client 12 will contact one of the servers, for example server 161, in the group 16 to access a resource, such as a data block, page, file, database, application, or other resource. The contacted server 161 itself may not hold or have control over the requested resource. However, in a preferred embodiment, the server group 16 is configured to make all the partitioned resources available to the client 12 regardless of the server that initially receives the request. For illustration, the diagram shows two resources, one resource 18 that is partitioned over all three servers, servers 161, 162, 163, and another resource 17 that is partitioned over two of the three servers. In the exemplary application of the system 10 being a block data storage system, each resource 18 and 17 may represent a partitioned block data volume.

In the embodiment of FIG. 1, the server group 16 therefore provides a block data storage service that may operate as a storage area network (SAN) comprised of a plurality of equivalent servers, servers 161, 162 and 163. Each of the servers 161, 162 and 163 may support one or more portions of the partitioned block data volumes 18 and 17. In the depicted system 10, there are two data volumes and three servers, however there is no specific limit on the number of servers. Similarly, there is no specific limit on the number of resources or data volumes. Moreover, each data volume may be contained entirely on a single server, or it may be partitioned over several servers, either all of the servers in the server group, or a subset of the server group. In practice, there may of course be limits due to implementation considerations, for example the amount of memory available in the servers 161, 162 and 163 or the computational limitations of the servers 161, 162 and 163. Moreover, the grouping itself, i.e., deciding which servers will comprise a group, may in one practice comprise an administrative decision. In a typical scenario, a group might at first contain only a few servers, perhaps only one. The system administrator would add servers to a group as needed to obtain the level of service required. Increasing servers creates more space (memory, disk storage) for resources that are stored, more CPU processing capacity to act on the client requests, and more network capacity (network interfaces) to carry the requests and responses from and to the clients. It will be appreciated by those of skill in the art that the systems described herein are readily scaled to address increased client demands by adding additional servers into the group 16. However, as client load varies, the system 10 as described below can redistribute client load to take better advantage of the available resources in server group 16. To this end, the system 10 in one embodiment, comprises a plurality of equivalent servers. Each equivalent server supports a portion of the resources partitioned over the server group 16. As client requests are delivered to the equivalent servers, the equivalent servers coordinate among themselves to generate a measure of system load and to generate a measure of the client load of each of the equivalent servers. In a preferred practice, this coordinating is done in a manner that is transparent to the clients 12, so that the clients 12 see only requests and responses traveling between the clients 12 and server group 16.

Figure 2:
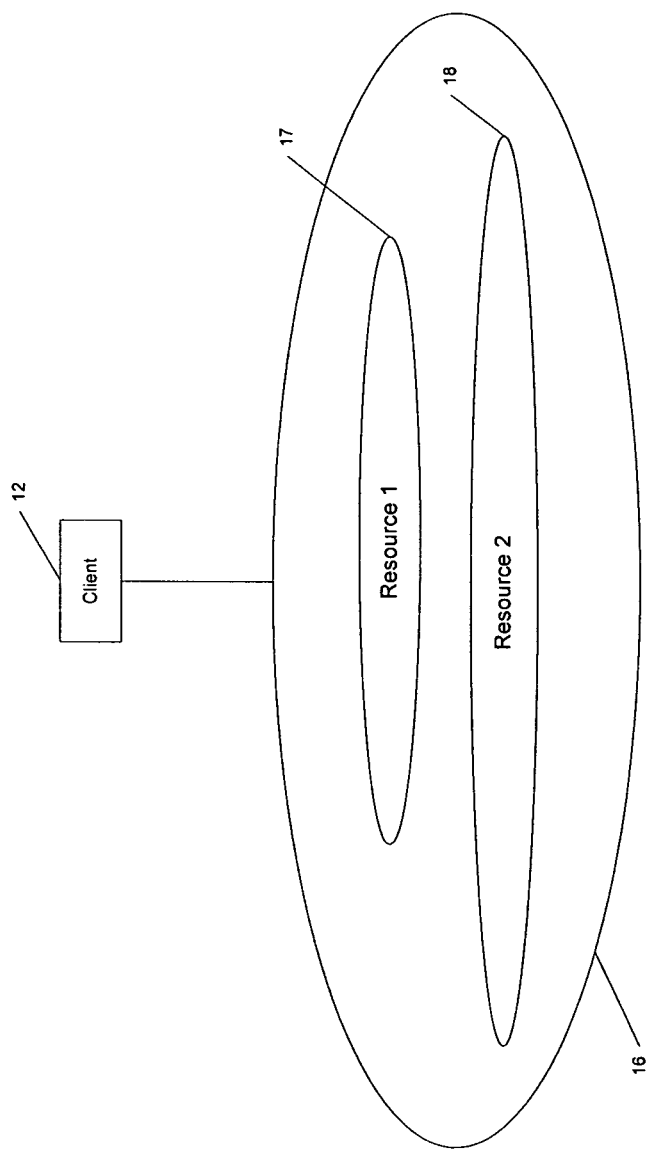
FIG. 2 is a schematic diagram of the server groups as seen by a client.

Referring now to FIG. 2, a client 12 connecting to a server 161 (FIG. 1) will see the server group 16 as if the group were a single server having multiple IP addresses. The client 12 is not aware that the server group 16 is constructed out of a potentially large number of servers 161, 162, 163, nor is it aware of the partitioning of the block data volumes 17, 18 over the several servers 161, 162, 163. As a result, the number of servers and the manner in which resources are partitioned among the servers may be changed without affecting the network environment seen by the client 12.

Figure 3:
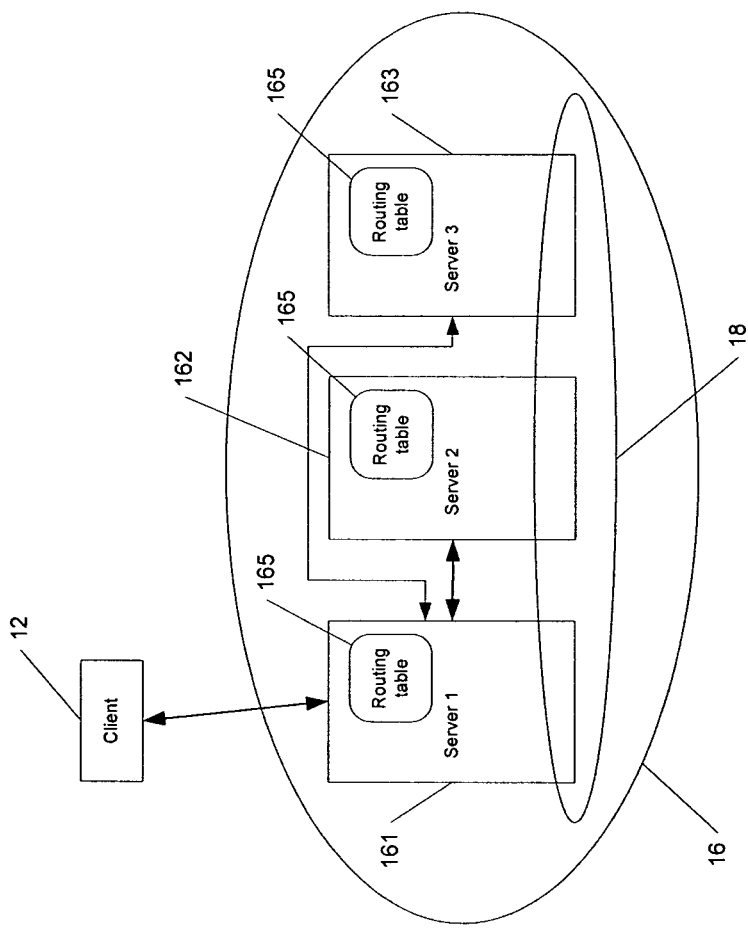
FIG. 3 shows details of the information flow between the client and the servers of a group.

Referring now to FIG. 3, in the partitioned server group 16, any volume may be spread over any number of servers within the group 16. As seen in FIGS. 1 and 2, one volume 17 (Resource 1) may be spread over servers 162, 163, whereas another volume 18 (Resource 2) may be spread over servers 161, 162, 163. Advantageously, the respective volumes are arranged in fixed-size groups of blocks, also referred to as "pages", wherein an exemplary page contains 8192 blocks. Other suitable page sizes may be employed. In an exemplary embodiment, each server in the group 16 contains a routing table 165 for each volume, with the routing table 165 identifying the server on which a specific page of a specific volume can be found. For example, when the server 161 receives a request from a client 12 for volume 3, block 93847, the server 161 calculates the page number (page 11 in this example for the page size of 8192) and looks up in the routing table 165 the location or number of the server that contains page 11. If server 163 contains page 11, the request is forwarded to server 163, which reads the data and returns the data to the server 161. Server 161 then send the requested data to the client 12. In other words, the response is always returned to the client 12 via the same server 161 that received the request from the client 12.

It is transparent to the client 12 to which server 161, 162, 163 he is connected. Instead, the client only sees the servers in the server group 16 and requests the resources of the server group 16. It should be noted here that the routing of client requests is done separately for each request. This allows portions of the resource to exist at different servers. It also allows resources, or portions thereof, to be moved while the client is connected to the server group 16—if that is done, the routing tables 165 are updated as necessary and subsequent client requests will be forwarded to the server now responsible for handling that request. At least within a resource 17 or 18, the routing tables 165 are identical. The described invention is different from a "redirect" mechanism, wherein a server determines that it is unable to handle requests from a client, and redirects the client to the server that can do so. The client then establishes a new connection to another server. Since establishing a connection is relatively inefficient, the redirect mechanism is ill suited for handling frequent requests.

Figure 4:
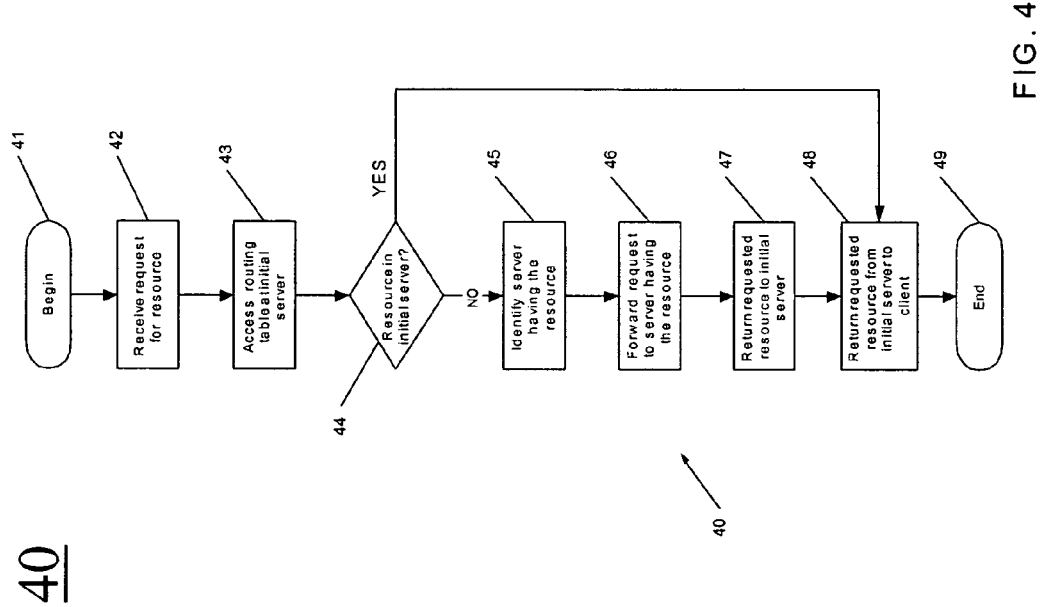
FIG. 4 is a process flow diagram for retrieving resources in a partitioned resource environment.

FIG. 4 depicts an exemplary request handling process 40 for handling client requests in a partitioned server environment. The request handling process 40 begins at 41 by receiving a request for a resource, such as a file or blocks of a file, at 42. The request handling process 40 checks, in operation 43, if the requested resource is present at the initial server that received the request from the client 12 examines the routing table, in operation 43, to determine at which server the requested resource is located. If the requested resource is present at the initial server, the initial server returns the requested resource to the client 12, at 48, and the process 40 terminates at 49. Conversely, if the requested resource is not present at the initial server, the server will consult a routing table, operation 44, use the data from the routing table to determine which server actually holds the resource requested by the client, operation 45. The request is then forwarded to the server that holds the requested resource, operation 46, which returns the requested resource to the initial server, operation 48. The process 40 then goes to 48 as before, to have the initial server forward the requested resource to the client 12, and the process 40 terminates, at 49.

The resources spread over the several servers can be directories, individual files within a directory, or even blocks within a file. Other partitioned services could be contemplated. For example, it may be possible to partition a database in an analogous fashion or to provide a distributed file system, or a distributed or partitioned server that supports applications being delivered over the Internet. In general, the approach can be applied to any service where a client request can be interpreted as a request for a piece of the total resource, and operations on the pieces do not require global coordination among all the pieces.

Figure 5:
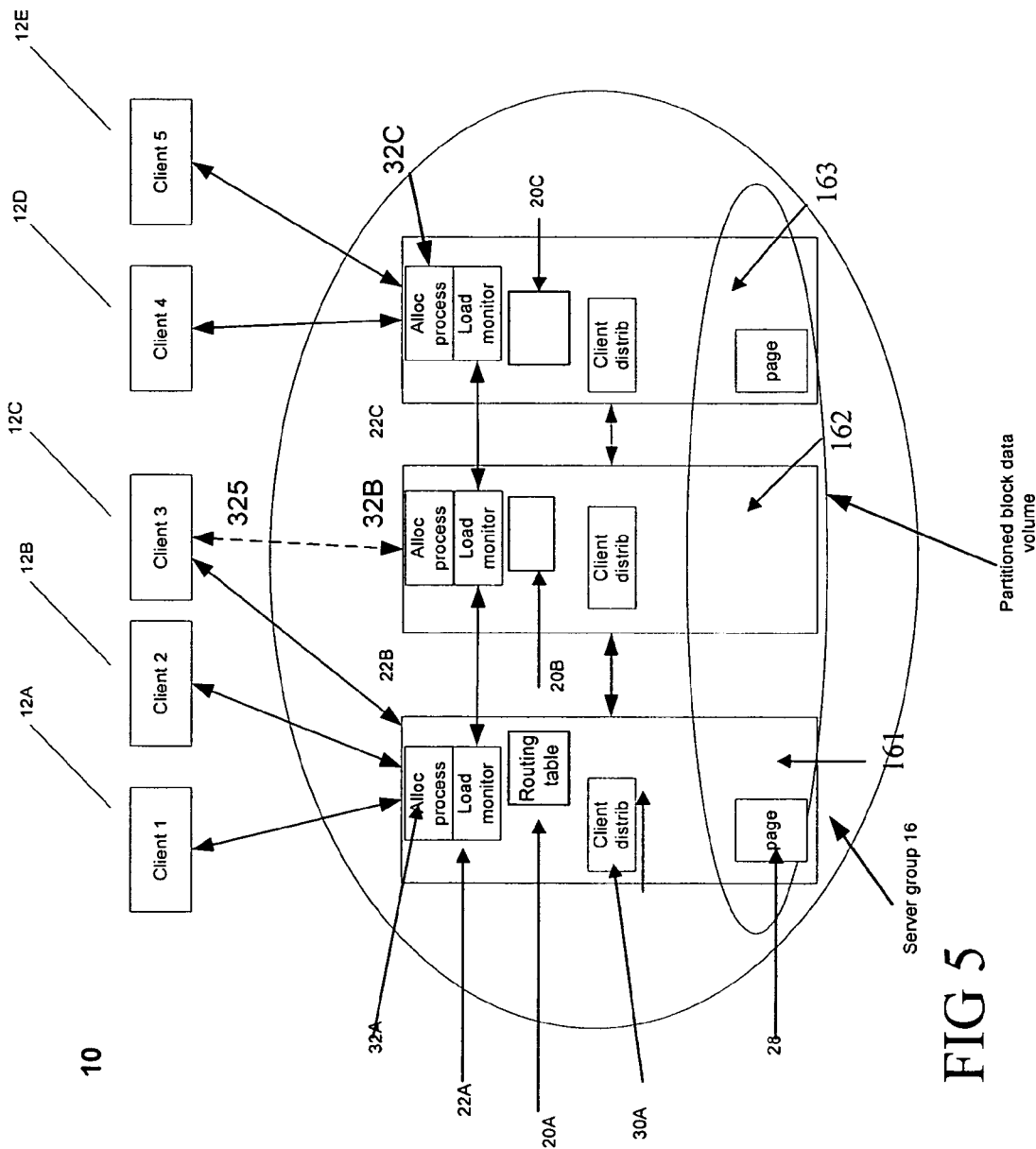
FIG. 5 depicts in more detail and as a functional block diagram one embodiment of a system according to the invention.

Turning now to FIG. 5, one particular embodiment of a block data service system 10 is depicted. Specifically, FIG. 5 depicts the system 10 wherein the client 12 communicates with the server group 16. The server group 16 includes three servers, server 161, 162 and 163. Each server includes a routing table depicted as routing tables 20A, 20B and 20C. In addition to the routing tables, each of the equivalent servers 161, 162 and 163 are shown in FIG. 5 as including a load monitor process, 22A, 22B and 22C respectively.

As shown in FIG. 5, each of the equivalent servers 161, 162 and 163 may include a routing table 20A, 20B and 20C respectively. As shown in FIG. 5, each of the routing tables 20A, 20B and 20C are capable of communicating with each other for the purposes of sharing information. As described above, the routing tables can track which of the individual equivalent servers is responsible for a particular resource maintained by the server group 16. In the embodiment shown in FIG. 5 the server group 16 may be a SAN, or part of a SAN, wherein each of the equivalent servers 161, 162 and 163 has an individual IP address that may be employed by a client 12 for accessing that particular equivalent server on the SAN. As further described above, each of the equivalent servers 161, 162 and 163 is capable of providing the same response to the same request from a client 12. To that end, the routing tables of the individual equivalent 161, 162 and 163 coordinate with each other to provide a global database of the different resources, and this exemplary embodiments data blocks, pages or other organizations of data blocks, and the individual equivalent servers that are responsible for those respective data blocks, pages, files or other storage organization.

FIG. 6 depicts an example routing table. Each routing table in the server group 16, such as table 20A, includes an identifier (Server ID) for each of the equivalent servers 161, 162 and 163 that support the partitioned data block storage service. Additionally, each of the routing tables includes a table that identifies those data blocks pages associated with each of the respective equivalent servers. In the embodiment depicted by FIG. 6, the equivalent servers support two partitioned volumes. A first one of the volumes, Volume 18, is distributed or partitioned across all three equivalent servers 161, 162 and 163. The second partitioned volume, Volume 17, is partitioned across two of the equivalent servers, servers 162 and 163 respectively.

The routing tables may be employed by the system 10 to balance client load across the available servers.

The load monitor processes 22A, 22B and 22C each observe the request patterns arriving at their respective equivalent servers to determine to determine whether patterns or requests from clients 12 are being forwarded to the SAN and whether these patterns can be served more efficiently or reliably by a different arrangement of client connections to the several servers. In one embodiment, the load monitor processes 22A, 22B and 22C monitor client requests coming to their respective equivalent servers. In one embodiment, the load monitor processes each build a table representative of the different requests that have been seen by the individual request monitor processes. Each of the load monitor processes 22A, 22B and 22C are capable of communicating between themselves for the purpose of building a global database of requests seen by each of the equivalent servers. Accordingly, in this embodiment each of the load monitor processes is capable of integrating request data from each of the equivalent servers 161, 162 and 163 in generating a global request database representative of the request traffic seen by the entire block data storage system 16. In one embodiment, this global request database is made available to the client distribution processes 30A, 30B and 30C for their use in determining whether a more efficient or reliable arrangement of client connections is available.

FIG. 5 illustrates pictorially that the server group 16 may be capable of redistributing client load by having client 12C, which was originally communicating with server 161, redistributed to server 162. To this end, FIG. 5 depicts an initial condition wherein the server 161 is communicating with clients 12A, 12B, and 12C. This is depicted by the bidirectional arrows coupling the server 161 to the respective clients 12A, 12B, and 12C. As further shown in FIG. 5, in an initial condition, clients 12D and 12E are communicating with server 163 and no client (during the initial condition) is communicating with server 162. Accordingly, during this initial condition, server 161 is supporting requests from three clients, clients 12A, 12B, and 12C. Server 162 is not servicing or responding to requests from any of the clients.

Accordingly, in this initial condition the server group 16 may determine that server 161 is overly burdened or asset constrained. This determination may result from an analysis that server 161 is overly utilized given the assets it has available. For example, it could be that the server 161 has limited memory and that the requests being generated by clients 12A, 12B, and 12C have overburdened the memory assets available to server 161. Thus, server 161 may be responding to client requests at a level of performance that is below an acceptable limit. Alternatively, it may be determined that server 161, although performing and responding to client requests at an acceptable level, is overly burdened with respect to the client load (or bandwidth) being carried by server 162. Accordingly, the client distribution process 30 of the server group 16 may make a determination that overall efficiency may be improved by redistributing client load from its initial condition to one wherein server 162 services requests from client 12C. Considerations that drive the load balancing decision may vary and some examples are the desire to reduce routing: for example if one server is the destination of a significantly larger fraction of requests than the others on which portions of the resource (e.g., volume) resides, it may be advantageous to move the connection to that server. Or to further have balancing of server communications load: if the total communications load on a server is substantially greater than that on some other, it may be useful to move some of the connections from the highly loaded server to the lightly loaded one, and balancing of resource access load (e.g., disk I/O load)—as preceding but for disk I/O load rather than comm load. This is an optimization process that involves multiple dimensions, and the specific decisions made for a given set of measurements may depend on adminstrative policies, historical data about client activity, the capabilities of the various servers and network components, etc.

To this end, FIG. 5 depicts this redistribution of client load by illustrating a connection 325 (depicted by a dotted bi-directional arrow) between client 12C and server 162. It will be understood that after redistribution of the client load, the communication path between the client 12C and server 161 may terminate.

Balancing of client load is also applicable to new connections from new clients. When a client 12F determines that it needs to access the resources provided by server group 16, it establishes an initial connection to that group. This connection will terminate at one of the servers 161, 162, or 163. Since the group appears as a single system to the client, it will not be aware of the distinction between the addresses for 161, 162, and 163, and therefore the choice of connection endpoint may be random, round robin, or fixed, but will not be responsive to the current load patterns among the servers in group 16.

When this initial client connection is received, the receiving server can at that time make a client load balancing decision. If this is done, the result may be that a more appropriate server is chosen to terminate the new connection, and the client connection is moved accordingly. The load balancing decision in this case may be based on the general level of loading at the various servers, the specific category of resource requested by the client 12F when it established the connection, historic data available to the load monitors in the server group 16 relating to previous access patterns from server 12F, policy parameters established by the administrator of server group 16, etc.

Another consideration in handling initial client connections is the distribution of the requested resource. As stated earlier, a given resource may be distributed over a proper subset of the server group. If so, it may happen that the server initially picked by client 12F for its connection serves no part of the requested resource. While it is possible to accept such a connection, it is not a particularly efficient arrangement because in that case all requests from the client, not merely a fraction of them, will require forwarding. For this reason it is useful to choose the server for the initial client connection only from among the subset of servers in server group 16 that actually serve at least some portion of the resource requested by new client 12F.

This decision can be made efficiently by the introduction of a second routing database. The routing database described earlier specifies the precise location of each separately moveable portion of the resource of interest. Copies of that routing database need to be available at each server that terminates a client connection on which that client is requesting access to the resource in question. The connection balancing routing database simply states for a given resource as a whole which servers among those in server group 16 currently provide some portion of that resource. For example, the connection balancing routing database to describe the resource arrangement shown in FIG. 1 consists of two entries: the one for resource 17 lists servers 162 and 163, and the one for resource 18 lists servers 161, 162, and 163. The servers that participate in the volumes) shown on FIG. 6 will serve for this purpose. The servers that participate in the volume have the entire routing table for that volume as shown on FIG. 6, while non-participating servers have only the bottom section of the depicted routing table. In the partitioning of the two volumes shown in FIG. 1, this means that server 161 has the bottom left table shown in FIG. 6 and both of the right side tables, while servers 161 and 162 have all four tables depicted.

At one point, the client 12C is instructed to stop making requests from server 161 and start making them to server 162. One method for this is client redirection, i.e., the client 12 is told to open a new connection to the IP address specified by the server doing the redirecting. Other mechanisms may be employed as appropriate.

Although FIG. 1 depicts the system as an assembly of functional block elements including a group of server systems, it will be apparent to one of ordinary skill in the art that the systems of the invention may be realized as computer programs or portions of computer programs that are capable of running on the servers to thereby configure the servers as systems according to the invention. Moreover, although FIG. 1 depicts the group 16 as a local collection of servers, it will be apparent to those or ordinary skill in the art that this is only one embodiment, and that the invention may comprise a collection or group of servers that includes server that are physically remote from each other.

As discussed above, in certain embodiments, the systems of the invention may be realized as software components operating on a conventional data processing system such as a Unix workstation. In such embodiments, the system can be implemented as a C language computer program, or a computer program written in any high level language including C++, Fortran, Java or basic. General techniques for such high level programming are known, and set forth in, for example, Stephen G. Kochan, *Programming in C*, Hayden Publishing (1983).

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. A system for managing a set of connections between a plurality of clients and a plurality of storage servers based on system load, comprising:
   a plurality of storage servers having a set of resources partitioned thereon, each of the storage servers in the plurality further comprising:
   at least one connection of the set of connections being a client communication connection from the storage server to at least one client, the at least one connection further requesting a given resource of the set of resources;
   a storage device for providing at least one volume of storage partitioned across the plurality of storage servers, such that a first portion of the given resource is located on a storage device associated with a first storage server of the plurality of storage servers, and such that a second portion of the given resource is located on a storage device associated with a second storage server of the plurality of storage servers;
   a load monitor process connected to communicate with other load monitor processes on at least one other storage server of the plurality of storage servers for generating a measure of overall system load, and for generating a measure of client load on each of the plurality of storage servers that have at least one portion of the given resource; and
   a client connection distribution process, responsive to the load monitor process, for repartitioning the set of connections and redistributing client load by disconnecting the at least one client communication connection from the first storage server and establishing a new connection from the at least one client communication connection to the second storage server based on a measurement of overall system efficiency determined from at least one of the measurement of overall system load, a category of the given resource requested, historical data available to the load monitor process in the plurality of storage servers relating to a previous access pattern from at least one storage server, policy parameters established for the plurality of servers, and the client load on each of the plurality of storage servers.

2. A system according to claim 1, further comprising:
   a load distribution process for determining resource loads when establishing new connections among storage servers.

3. A system according to claim 1, further comprising:
   a client allocation process for causing a client to communicate with a selected one of said plurality of servers.

4. A system according to claim 1, further comprising:
   a client allocation process for distributing incoming client requests across said plurality of servers.

5. A system according to claim 1, wherein the client distribution process includes a round robin distribution process.

6. A system according to claim 1, wherein the client distribution process includes a disconnect process for dynamically disconnecting a client from a first server and reconnecting to a second server.

7. A system according to claim 1, wherein the client distribution process adaptively distributes new client connections across the plurality of servers as a function of dynamic variations in measured system load.

8. A system according to claim 1, further comprising:
   a storage device for providing storage resources to the plurality of clients.

9. A storage area network, comprising:
   a plurality of servers each configured as a server of claim 1.

10. An information storage server apparatus comprising:
  one or more client communication connections to a plurality of client devices;
  a server communication connection to at least one other storage server;
  a storage device for storing a portion of a partitioned resource thereon, such that a first portion of a partitioned resource is stored on the storage server, and such that other portions of the partitioned resource are stored on the one other storage server;
  a request handler, for receiving requests for access to the partitioned resource via at least one client communication connection, and determining which portions of the partitioned resource are stored on the storage device, and which portions of the partitioned resource are stored on the one other storage server;
  a load monitor, for:
    determining a local load placed on the storage server by the request handler;
    receiving information via the server communication connection concerning a load on the other server; and
    generating a measure of load based on at least one of a category of the given resource requested, historical data available to the load monitor process in the plurality of storage servers relating to a previous access pattern from at least one storage server, policy parameters established for the plurality of servers, and the client load on each of the plurality of storage servers from both the local load and the load on the other server; and
  a client load distributor, responsive to the load monitor, for closing a client communication connection to at least one client device and requesting the at least one storage server to open a new client communication connection to the at least one client device when the measure of load indicates the storage server is over utilized and overall system efficiency may be improved.

11. The apparatus of claim 10 wherein the partitioned resource is at least one of a file, a file directory, a data block, a page, a database, or an application program.

12. The apparatus of claim 10 wherein the storage server and the other storage server are addressable by the client as a server group.

13. The apparatus of claim 12 wherein closing of the client communication connection by the client load distribution process is transparent to the client.

14. The apparatus of claim 10 additionally comprising:
  a routing table, for storing information concerning which portions of the partitioned resource are stored on the storage server and which portions of the partitioned resource are stored on the other storage server.

15. The apparatus of claim 10 wherein the storage server and the other storage server are part of a storage area network.

16. The apparatus of claim 10 wherein the storage server and the other storage server are equivalent servers such that each equivalent server comprises a request handler, a load monitor and a client load distributor.

17. A method for handling information by providing a storage server comprising:
  connecting to a plurality of client devices over one or more client communication connections;
  connecting to at least one other storage server over a server communication connection;
  storing a portion of a partitioned resource on a storage device local to the storage sever, such that a first portion of the partitioned resource is stored on the storage server, and such that at least one other portion of the partitioned resource is stored on the other storage server;
  receiving requests for access to the partitioned resource from at least one of the clients, and determining if portions of the requested partitioned resource are stored on the storage device, and determining if portions of the requested portioned resource are stored on the other storage server and, if at least one portion of the requested resource is stored on either the storage device or the other server, directing the request to be served by a selected one of the storage server or the other storage server;
  measuring a load by
    determining a local load placed on the storage server based on the requests for access to the partitioned resource;
    receiving information via the server communication connection concerning a load on the other server; and
    generating a load measure based on at least one of a category of the given resource requested, historical data available to the load monitor process in the plurality of storage servers relating to a previous access pattern from at least one storage server, policy parameters established for the plurality of servers, and the client load on each of the plurality of storage servers using both the local load and the load on the other server; and
  distributing client load by closing a client communication connection from one of the storage server or the other server to at least one client device, and requesting the other one of the storage server or the other server to open a new connection to the client device when the load measure indicates the storage server is over utilized and overall system efficiency may be improved.

18. The method of claim 17 wherein the partitioned resource is at least one of a file, a file directory, a data block, a page, a database, or an application program.

19. The method of claim 17 wherein the storage server and the other storage server are addressed as a server group by the client.

20. The method of claim 17 wherein closing the client communication connection by the client load distribution process is transparent to the client.

21. The method of claim 17 additionally comprising:
  storing information in a routing table concerning which portions of the partitioned resource are stored on the storage server and which portions of the partitioned resource are stored on the other storage server.

22. The method of claim 17 wherein the storage server and the other storage server are part of a storage area network.

23. The method of claim 17 wherein the storage server and the other storage server are equivalent servers such that each perform the steps of request handling, measuring load and distributing client load.

24. A tangible, non-transitory, computer readable medium for storing computer executable instructions for providing a storage server function, with the computer executable instructions for:
  connecting to a plurality of client devices over one or more client communication connections;
  connecting to at least one other storage server over a server communication connection;
  storing a portion of a partitioned resource on a storage device local to the storage sever, such that a first portion of the partitioned resource is stored on the storage server, and such that at least one other portion of the partitioned resource is stored on the other storage server;

receiving requests for access to the partitioned resource from at least one of the clients, and determining if portions of the requested partitioned resource are stored on the storage device, and determining if portions of the requested portioned resource are stored on the other storage server and, if at least one portion of the requested resource is stored on either the storage device or the other server, directing the request to be served by a selected one of the storage server or the other storage server;

measuring a load by determining a local load placed on the storage server based on the requests for access to the partitioned resource;

receiving information via the server communication connection concerning a load on the other server; and generating a load measure based on at least one of a category of the given resource requested, historical data available to the load monitor process in the plurality of storage servers relating to a previous access pattern from at least one storage server, policy parameters established for the plurality of servers, and the client load on each of the plurality of storage servers using both the local load and the load on the other server; and distributing client load by closing a client communication connection from one of the storage server or the other server to at least one client device, and requesting the other one of the storage server or the other server to open a new connection to the client device when the load measure indicates the storage server is over utilized and overall system efficiency may be improved.

25. An information storage server apparatus comprising:

one or more network interfaces providing communication connections to a plurality of client devices and a server communication connection to a plurality of other storage servers;

a storage device for storing a portion of a partitioned resource thereon, such that a first portion of a partitioned resource is only stored on the storage server, and such that a second portion of the partitioned resource is only stored on one of the plurality of other servers;

opening an initial connection between one of the client devices and the storage server only if the storage server actually stores at least the first portion of the partitioned resource;

a request handler, for receiving requests for access to the partitioned resource via at least one client device, and determining if portions of the partitioned resource are stored on the storage device, and if portions of the partitioned resource are stored on the other storage server;

a load monitor, for:

determining a local load placed on the storage server by the request handler;

receiving information via the server communication connection concerning a load on the other server; and generating a measure of load based on at least one of a category of the given resource requested, historical data available to the load monitor process in the plurality of storage servers relating to a previous access pattern from at least one storage server, policy parameters established for the plurality of servers, and the client load on each of the plurality of storage servers from both the local load and the load on the other server; and a client connection distributor, responsive to both the request handler and the load monitor, for closing a client communication connection from the storage server to the client device and requesting that one of the plurality of other storage servers open a new client communication connection to the at client device when the measure of load indicates the storage server is over utilized.

* * * * *